United States Patent [19]

Lebeck et al.

[11] Patent Number: 4,792,146
[45] Date of Patent: Dec. 20, 1988

[54] RADIALLY COMPLIANT - ZERO NET THERMAL RADIAL TAPER MECHANICAL FACE SEAL

[75] Inventors: Alan O. Lebeck, Albuquerque; Lionel A. Young, Edgewood, both of N. Mex.

[73] Assignee: University of New Mexico, Albuquerque, N. Mex.

[21] Appl. No.: 15,852

[22] Filed: Feb. 17, 1987

[51] Int. Cl.$^4$ ............................................. F16J 15/34
[52] U.S. Cl. ....................................... 277/26; 277/92; 277/93 SD; 277/96
[58] Field of Search ................. 277/22, 26, 85–87, 277/92, 93 R, 93 SD, 96, 96.2, 96.1

[56] References Cited

U.S. PATENT DOCUMENTS

| | | | |
|---|---|---|---|
| 3,199,795 | 8/1965 | Bennett et al. | 241/101 |
| 3,244,425 | 4/1966 | Wilkinson | 277/92 |
| 3,347,552 | 10/1967 | Frisch | 277/27 |
| 3,392,984 | 7/1968 | Reinsma et al. | 277/92 |
| 3,467,448 | 9/1969 | Galle | 308/8.2 |
| 3,500,503 | 3/1970 | Cleereman et al. | 18/42 |
| 3,601,413 | 8/1971 | Darnell | 277/96 |
| 3,718,335 | 2/1973 | Dernedde et al. | 277/26 |
| 3,765,689 | 10/1973 | Adams | 277/26 |
| 3,782,735 | 1/1974 | Novosad | 277/92 X |
| 3,813,103 | 5/1974 | Wiese | 277/27 |
| 3,921,986 | 11/1975 | Geary et al. | 277/83 |
| 3,939,903 | 2/1976 | Sakaki et al. | 165/9 |
| 4,026,564 | 5/1977 | Metcalfe | 277/96.1 |
| 4,058,321 | 11/1977 | Gavrun et al. | 277/81 P |
| 4,099,728 | 7/1978 | Wiese | 277/96 |
| 4,195,852 | 4/1980 | Roley et al. | 277/92 |
| 4,196,912 | 4/1980 | Quitberg | 277/81 R |
| 4,212,475 | 7/1980 | Sedy | 277/93 SD X |
| 4,226,429 | 10/1980 | Sato et al. | 277/96.2 |
| 4,261,581 | 4/1981 | Hershey | 277/9 |
| 4,272,084 | 6/1981 | Martinson et al. | 277/30 |
| 4,281,839 | 8/1981 | Schoenmeyr | 277/93 SD |
| 4,290,613 | 9/1981 | Scott | 277/96.1 |
| 4,298,205 | 11/1981 | Ostling | 277/197 |
| 4,361,334 | 11/1982 | Amorese et al. | 277/16 |
| 4,391,450 | 7/1983 | Beck | 277/1 |
| 4,407,512 | 10/1983 | Trytek | 277/96.1 |
| 4,415,168 | 11/1983 | Takenaka et al. | 277/96.1 |
| 4,426,092 | 1/1984 | Wiese | 277/96.1 |

OTHER PUBLICATIONS

Asle Transactions, vol. 23, 4, pp. 375–387, presented Apr. 30–May 3, 1979, A. O. Lebeck.

*Primary Examiner*—Robert S. Ward
*Attorney, Agent, or Firm*—Deborah A. Peacock

[57] ABSTRACT

A radially compliant and zero net thermal radial taper mechanical face seal. The seal includes a primary seal ring which is radially compliant to the opposing ring due to its narrow ring length, and an opposing ring which has a geometry and physical characteristics such that the thermal rotation caused by itself and the primary ring is zero. The seal includes further design features for enhancing the radial compliance and the zero net thermal rotation characteristics.

18 Claims, 9 Drawing Sheets

RADIALLY COMPLIANT - ZERO NET THERMAL RADIAL TAPER MECHANICAL FACE SEAL

BACKGROUND OF THE INVENTION

This invention relates to a new mechanical face seal design which improves the performance characteristics of the seal. A mechanical face seal is a device which controls fluid leakage between two regions under different pressures while allowing a rotating shaft to pass between the regions. Such seals are widely used in ships, submarines, process pumps, and compressors.

Conventional mechanical face seals will often leak and sometimes have short lives because the geometry between the seal faces deviates from parallel due to various thermal- and pressure-caused distortions of the seal. Mechanical seals are generally known as troublesome devices because it is most often the failure of a seal which necessitates the rebuilding of a pump. Mechanical seals, in general, have only a fraction of the life of bearings. Seals having longer life with low leakage and reliable performance would serve to upgrade the performance of mechanical equipment and reduce the cost of operation. Conventional seals usually have high thermal distortion, and they are so rigid (low radial compliance) that the faces cannot deflect back to the desired parallel condition.

Attempts have been made in the prior art to achieve radial compliance, but these attempts have not been entirely successful. U.S. Pat. No. 4,212,475, entitled SELF ALIGNING SPIRAL GROOVE FACE, to Sedy; Sedy, Josef, "Improved Performance of Film-Riding Gas Seals Through Enhancement of Hydrodynamic Effects," *ASLE* Preprint No. 78-LC-3B-1, October, 1978; and Sedy, Josef, "A New Self-Aligning Mechanism for the Spiral-Groove Gas Seal Stability" *ASLE* Preprint No. 79-LC-3B-3, October, 1979; all disclose the use of a low Young's modulus material ring to enhance compliance with an opposing ring. However, the Sedy seal does not completely remain parallel; some degree of angular misalignment remains. This misalignment is probably due to the long length or thickness of the Sedy ring which thus has a high stiffness.

Other prior art seals have not been successful in achieving radial compliance and alignment. U.S. Pat. No. 3,921,986, entitled SHAFT SEAL, to Geary et al., discloses the use of a resilient mounting to aid in ring alignment; however, this patent does not disclose the use of a compliant or conformable ring to assist in the alignment. U.S. Pat. No. 4,099,728, entitled MECHANICAL SEAL ASSEMBLY, to Wiese, discloses a seal having a soft material nonrotatable sealing ring and a hard material backup ring; however, the seal design is rigid, and thus misalignment occurs. U.S. Pat. No. 4,991,450, entitled SHAFT SEAL RESISTANT TO ELECTROKINETIC CORROSION, to Beck, discloses a seal having a hard element attached to one ring and a soft element attached to another ring; however this patent does not disclose the use of the varying hardness materials for the rings, themselves.

Accordingly, it is a primary object of the present invention to provide a seal having minimal or no leakage, a high tolerance to variable operating conditions, a long life, and high duty capabilities.

It is another object of the present invention to provide a radially compliant seal ring and a zero net thermal rotation seal design.

Yet another object of the present invention is to provide a seal which enhances radial compliance and zero net thermal radial taper.

Other objects and further scope of applicability of the present invention will become apparent from the detailed description to follow, taken in conjunction with the accompanying drawing.

SUMMARY OF THE INVENTION

This invention is related to a seal design having a zero net thermal distortion and a radially compliant face seal ring. In this preferred design, the steady-state thermal rotation is minimized and any remaining radial taper is readily conformed to by the radially compliant design. Thus, the seal faces are able to stay parallel throughout all operating conditions. This leads to uniform wear and uniform contact across the faces. Uniform contact gives the lowest possible leakage between the face surfaces. Use of this geometry not only reduces leakage for otherwise conventional seals, but it also allows for the use of low balance ratios (even as low as 50%) so that one can increase the duty level of seals and/or expect significantly longer seal life from the same materials. The value of this new and improved seal design to the seal user is that it will have a longer life and lower leakage, particularly in services where there are transients.

The radially compliant ring of the invention is preferably made of a low Young's modulus material and its axial length is thin so that it can readily conform to the opposing seal. In some situations, the axial ring length, $l_r$, is on the order of the ring radial face width; this is much smaller than conventional seal ring lengths.

The axial ring length, $l_r$, is preferably approximated, in accordance with the invention, by the following equation, $$l_r^3 < \frac{3}{\pi E K_t f \omega}$$

wherein E is the Young's modulus of the ring material, $K_t$ is the thermal rotation coefficient of the face in terms of rotation per unit of power (this varies with seal size), f is the friction coefficient associated with contact friction at the face and $\zeta$ is the angular speed of the shaft.

An alternative means of determining the axial ring length, $l_r$, in accordance with the invention, is by utilizing the following equation:

$$\phi_{compliance} = \frac{6[p_o(B - \frac{1}{2}) + p_s]\Delta r r_c^2}{E l_r^3}$$

wherein $\phi_{compliance}$ is the maximum angular difference to which the primary ring can comply while remaining in contact with the mating ring, $p_o$ is the sealed pressure, B is the balance ratio, $p_s$ is the spring pressure, $\Delta r$ is the face width, E is the Young's modulus, and $r_c$ is the radius to the centroid of the ring.

The preferred seal of the invention comprises a radially compliant seal ring made of a low Young's modulus material and a zero net thermal radial taper design. This zero net thermal taper design is achieved, in accordance with the invention, by shaping the opposing ring such that the thermal rotation of the opposing ring is equal and opposite to the thermal rotation of the radially compliant face seal ring, thereby "netting out" the thermal radial rotation to zero. This can also be achieved, in accordance with the invention, by placing insulation around tee rings such that the thermal rotation is controlled.

The preferred seal of the invention further comprises the following to enhance the radial compliance and the zero net thermal rotation characteristics:

(1) a flexibly mounted carrier which forms part of the radially compliant seal ring;

(2) a secondary seal for sealing the carrier;

(3) an elastomer which is placed between the carrier and the radially compliant seal ring for transmitting the entire load from the sealed pressure to the radially compliant face seal ring without imposing any moment on it, and to act as an insulator for heat between the carrier and the radially compliant seal ring;

(4) a tertiary seal for sealing the radially compliant seal ring; and (5) a bleed passage for preventing leakage past the tertiary seal from causing fluid pressure to build up behind the radially compliant seal ring. The elastomer, carrier, radially compliant seal ring and seals can all or partially be incorporated into a one-piece arrangement.

DESCRIPTION OF THE PREFERRED EMBODIMENT

This invention relates to a new and improved seal and seal ring design. The preferred seal of the invention comprises a radially compliant seal ring and a zero net thermal radial taper design.

Figure 1:
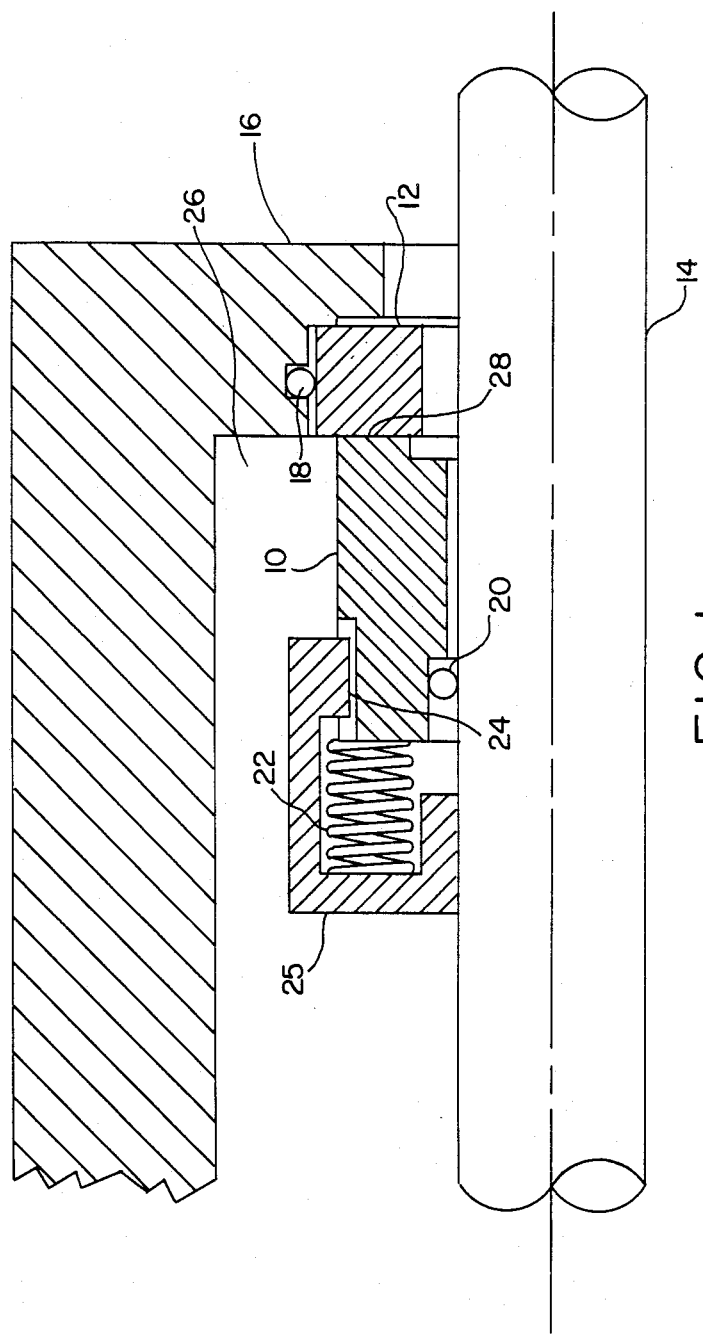
FIG. 1 of the drawing is a cross-sectional view of a conventional prior art mechanical face seal.

FIG. 1 illustrates a conventional type of mechanical face seal. The main parts of the seal are discussed below so that the novelty of the present invention can be described. The seal shown in Fig. 1 comprises two rings, a primary ring 10 and a mating ring 12, a shaft 14, a housing 16, seals such as O-rings 18 and 20, urging or compressing means such as a spring 22, a flexible drive arrangement 24, a retainer 25, and sealed fluid 26. The primary ring 10 is typically flexibly mounted so that it can uniformly press against the mating ring 12 due to action of the hydrostatic pressure created by the fluid 26 and the springs 22. Flexible mounting of the primary ring 10 requires a flexible secondary seal 20 which may be an O-ring type seal or a bellows, and a flexible drive arrangement 24 as shown in FIG. 1. The primary ring 10 may rotate with the shaft 14, as shown, or it may be flexibly attached to the housing 16. The mating ring 12 may be fixed to the housing 16 and sealed by the O-ring 18, as shown, or it may be attached to the shaft 14. The seal is formed at a sliding interface 28 or "face" between the primary ring 10 and the mating ring 12. The sealed fluid 26 attempts to flow across the sliding interface 28, which is generally a narrow radial passage.

Figure 2:
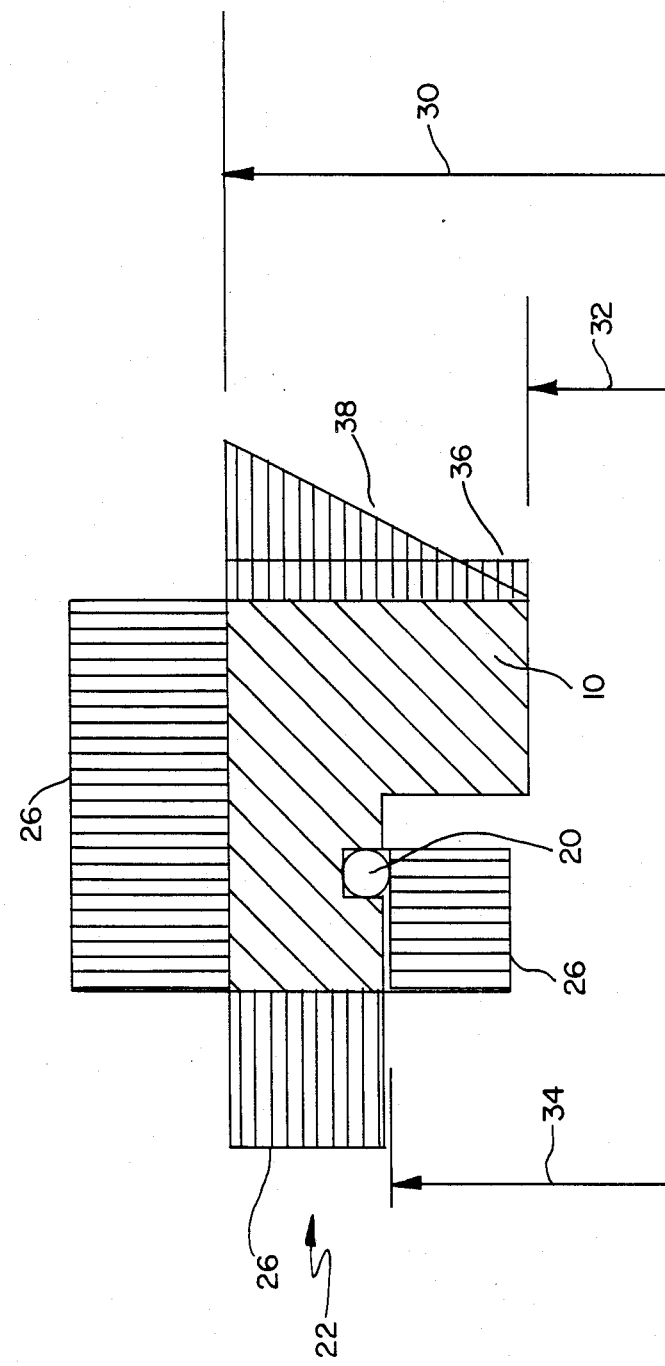
FIG. 2 of the drawing is a cross-sectional view of a typical seal ring and illustrates the pressures acting on the seal ring and the parameters of the seal ring.

FIG. 2 shows a force diagram of a primary ring 10 in a seal; the lines illustrate pressures acting on this ring 10 during operation. The dashed line represents the center line of the seal ring. The parameters of the seal ring 10 are: an outer radius of contact $r_o$ 30, an inner radius of contact $r_i$ 32, and a balance radius $r_b$ 34. With these three parameters, the balance ratio of the seal, B, can be calculated according to the following equation:

$$B = \frac{r_o^2 - r_b^2}{r_o^2 - r_i^2} \quad \text{(Equation 1)}$$

The ideal theory of operation for a contacting mechanical face seal is as follows. It is assumed that the gap between the faces or sliding interface 28 (see FIG. 1) is uniform radially across the seal and that contact pressure 36 at the face 28 is uniform. For a liquid, the fluid pressure distribution 38 across the face 28 is approximately linear for parallel face surfaces as shown in FIG. 2. The applied load on the seal shown in FIG. 2 is caused by the spring force 22 and the effect of the hydrostatic pressure due to the fluid 26 acting on the seal ring 10. The total load applied to the seal which acts to the right is generally designed to be greater than the force which is created by the linear pressure distribution 38 acting to the left. However, since the total load applied to the right should equal to the total load applied to the left, the contact pressure 36 must take on whatever value is needed to provide this equilibrium.

In this ideal situation where the gap or interface is parallel and there is contact all across the face, the leakage of the seal is controlled primarily by flow resistance between the parallel face surfaces. If hydrodynamic forces are not large, the seal gap approaches a minimum value of that which corresponds to the roughness of the face surfaces. Thus, leakage will be the minimum possible since the parallel surfaces and the minimum gap give the greatest possible resistance to leakage. One can consider this situation to be ideal from the standpoint of minimizing leakage. Most importantly, if the contact pressure is uniform, then the wear of the faces surfaces will be uniform, and the ideal situation of having a parallel, even face will continue in spite of ring wear.

Figure 3:
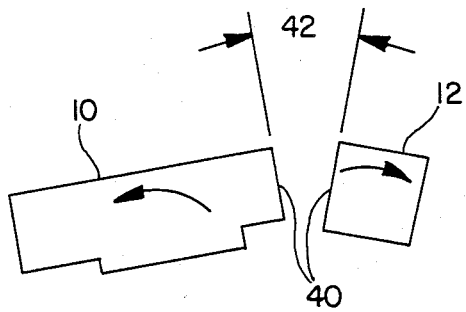
FIG. 3 of the drawing is a sectional view of a typical seal ring showing thermal distortion resulting from friction heating at the faces of the seal ring, which leads to uneven wear in a conventional prior art seal.
Figure 4:
FIG. 4 of the drawing is a sectional view of a typical seal ring showing contact configuration during operation, which leads to uneven wear in a conventional prior art seal.
Figure 5:
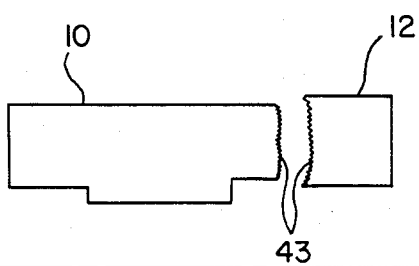
FIG. 5 of the drawing is a sectional view of a typical seal ring showing non-uniform wear in conventional prior art seals.

However, there are fundamental mechanisms which alter real behavior from the ideal operation discussed above. The first of these is thermal distortion. FIGS. 3–5 shows the effect of thermal distortion on conventional seal operation. Each dashed line in FIGS. 3–5 represent the center line of the seal ring. Heat is generated at the sliding interface in a face seal. This heat, referred to as "heat input" 40, causes heat to flow away from the face into the seal rings 10 and 12 where it then flows into the surrounding fluid. This type of heat generation and flow causes the face surfaces of the seal rings to be hotter than the bulk of the cross sections of the rings. The result is that the seal rings 10 and 12 will distort as shown by the curved arrows in FIG. 3 such that some relative angle 42 between the faces will occur. This angle 42 is called thermal radial taper, thermal coning, thermal rotation or thermal taper. When such thermally distorted faces mate, contact initially occurs at the inside corner, as shown in FIG. 4. If the operation of the seal is in a steady state, the seal faces will eventually wear back to a parallel face condition, and the seal operation will be similar to that discussed above for the ideal situation shown in FIG. 2. However, in many applications, operating conditions change and the seal may undergo a cyclic operation. In such situations, each time the seal heats up during operation, the angle of presentation of the face surfaces to each other (the thermal radial taper) will change during these changing operating conditions. The result is that the seal face surfaces cannot wear uniformly, and they will become distorted or out of flat 43 in the radial direction, as shown in FIG. 5. The consequence of this out-of-flatness 43 is that the seal will leak more than if its face surfaces remain parallel. In fact, when the face surfaces become sufficiently radially out of flat 43, the seal may excessively leak and become classified as having failed.

FIG. 2 illustrates the origin of a second mechanism which causes distortion of the seal ring face. If the sum of the moments of all of the forces shown in FIG. 2 about the centroid of the ring is other than zero, then the seal ring 10 will distort such as shown in FIG. 3. Since such a non-zero sum of forces is proportional to pressure, then a seal operating under variable-pressure operating conditions will have a changing face-presentation angle 42 and the faces will distort or wear such as shown in FIG. 5.

In the present invention, an improved seal has been designed which minimizes or completely eliminates the distortions discussed above. The ideal seal operating conditions of low leakage and uniform wear are achieved using the seal of the present invention. Two principles which are utilized in accordance with the invention lead to the above ideal conditions. These principles are radial compliance and zero net thermal rotation, which are both discussed below.

Figure 6:
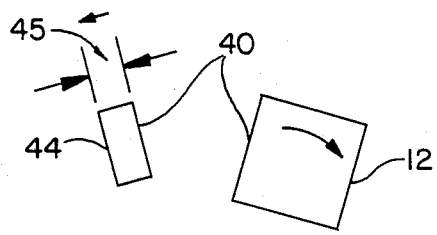
FIG. 6 of the drawing is a sectional view showing natural consequence of thermal distortion resulting from heating at the faces of a radially compliant seal ring of the present invention.
Figure 7:
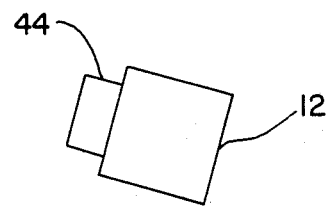
FIG. 7 of the drawing is a sectional view showing contact configuration at during operation of a radially compliant seal ring of the present invention as it aligns itself with a mating face so as to produce parallel contact.
Figure 8:
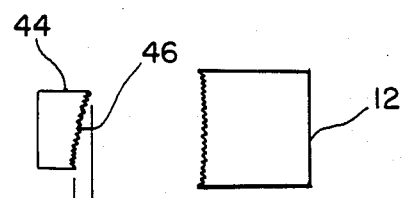
FIG. 8 of the drawing is a sectional view showing the resulting near flat, but unequal wear, of a radially compliant seal ring of the present invention.

FIGS. 6–8 illustrates the concept of radial compliance of the present invention. Each dashed line represents the center line of the seal ring. FIG. 6 shows the natural consequence of thermal distortion (see the curved arrow) on a seal ring 12 due to heat input 40. The seal ring 44 of the present invention, however, does not distort as shown in FIG. 4, but instead radially complies or presses flat against the opposing ring 12. FIG. 7 shows how the radially compliant ring 44, having a ring length $l_r$ 45, is pressed flat against the mating ring 12 during operation. FIG. 8 shows that the wear profile 46 produced is in a radial plane because the seal rings 12 and 44 remain in contact all across the face. However, because of thermal distortion, there will be stronger contact at the inside and, therefore, over a long period of operation, the inside will tend to wear more than the outside 48.

Figure 9:
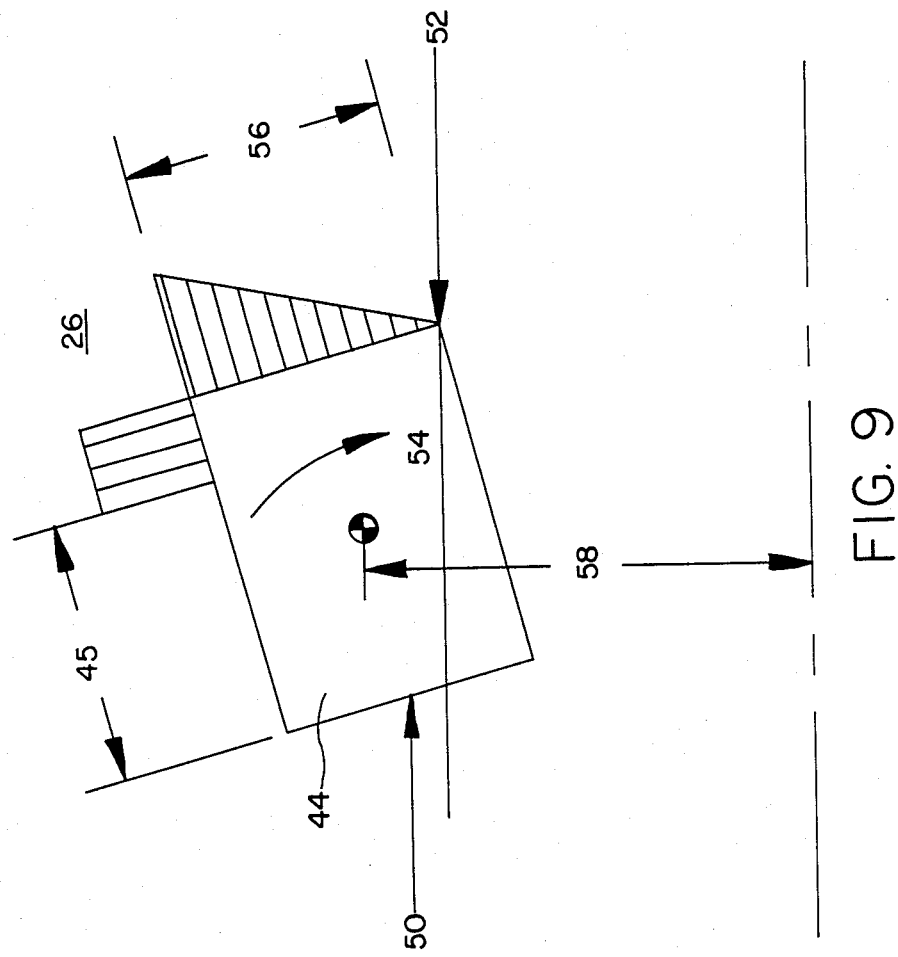
FIG. 9 of the drawing is a force diagram of a cross section of a compliant seal ring of the invention and the pressures acting on the seal ring.

FIG. 9 illustrates a moment 54 (as shown by the curved arrow) which is created by a couple consisting of an applied load to the right 50 and a contact pressure load concentrated at the inside radius 52. The dashed line represents the center line of the seal ring. This moment causes the radially compliant ring of the invention 44 to bend from its thermally distorted shape to an angle, referred to as the "compliance angle," equal to that of the mating ring 12. The maximum compliance angle, $\phi_{compliance}$, is the maximum angular difference to which the primary ring 44 can comply while remaining in contact with the mating ring 12, and is proportional to the moment 54. The maximum compliance angle 54 is a function of the sealed pressure $p_o$ caused by the sealed fluid 26, the balance ratio B (see Equation 1), the spring pressure $p_s$ at the face, the face width $\Delta r$ 56, the Young's modulus E of the ring material, the radius to the centroid of the ring $r_c$ 58, and the axial length of the ring $l_r$ 45.

The maximum compliance angle 54, $\phi_{compliance}$, is calculated as follows:

$$\phi_{compliance} = \frac{6[p_o(B - \frac{1}{2}) + p_s]\Delta r r_c^2}{E l_r^3} \qquad \text{(Equation 2)}$$

Equation 2 indicates that one must have a small ring length $l_r$ 45 in order to have significant compliance. As an example, in conventional seals, a typical ring length $l_r$ might be on the order of ten or more millimeters. With this thickness, negligible compliance is obtained. A corresponding ring, made in accordance with the present invention, on the other hand, would have a ring length $l_r$ on the order of only a few millimeters and would comply to typical thermal distortions.

The radially compliant seal of the invention is used in accordance with the invention to cause seal face surfaces to maintain contact all across the face in spite of either thermal or mechanically caused distortions. The magnitudes of the thermal and the pressure-caused distortions must be assessed so that the maximum needed compliance angle can be determined. Equation 2 is useful to determine the ring length $l_r$, in accordance with the invention, to assure that there is sufficient compliance of the ring to maintain the desired contact.

The axial ring length or thickness $l_r$ of the radially compliant seal is preferably estimated in accordance with the invention by the following equation, $$l_r^3 < \frac{3}{\pi E K_t f \omega} \quad \text{(Equation 3)}$$

wherein E is the Young's modulus of the ring material, $K_t$ is the thermal rotation coefficient of the face in terms of rotation per unit of power (this varies with seal size), f is the friction coefficient associated with contact friction at the face, and is the angular speed of the shaft. $K_t$ is determined by summing the thermal rotation for both rings (see Equation 4 below) and dividing by the power.

Figure 10:
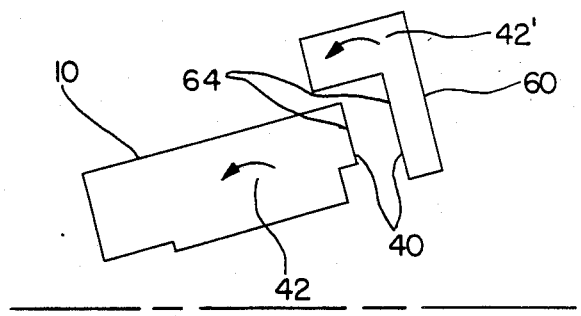
FIG. 10 of the drawing shows a zero net thermal radial taper seal design of the invention illustrating equal thermal distortion resulting from friction heating at the faces, thus producing uniform wear.
Figure 11:
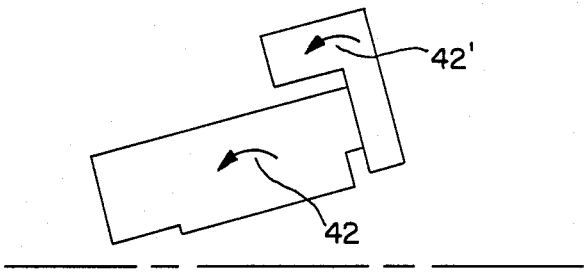
FIG. 11 of the drawing shows a zero net thermal radial taper seal design of the invention illustrating contact configuration, thus producing uniform wear.
Figure 12:
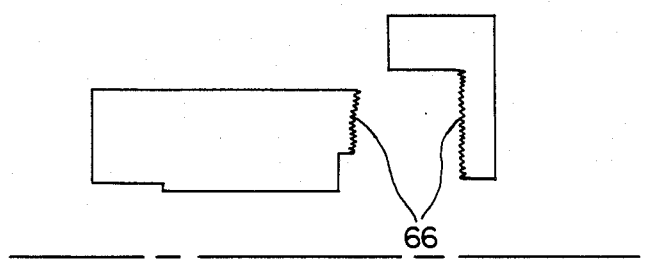
FIG. 12 of the drawing shows a zero net thermal radial taper seal design of the invention illustrating the resulting near uniform wear.

FIGS. 10-12 illustrates the principle of zero net thermal rotation which is useful in accordance with the invention. Each dashed line represents the center line of the seal ring. The mating seal ring 60 of the invention is designed such that the direction of the thermal radial taper 42' (see curved arrow) is opposite to that which occurs in a conventional mating ring 12 as illustrated by the curved arrow in FIGS. 3-5. FIG. 10 shows the thermal radial taper 42 and 42' or distortion for mating seal rings where both rings 10 and 60 distort in the same direction by the same amount, resulting in parallel faces 64. When such rings 10 and 60 are pressed together in contact as shown in FIG. 11, contact will be uniform across the entire face and will result in uniform wear 66 such as shown in FIG. 12.

Figure 13:
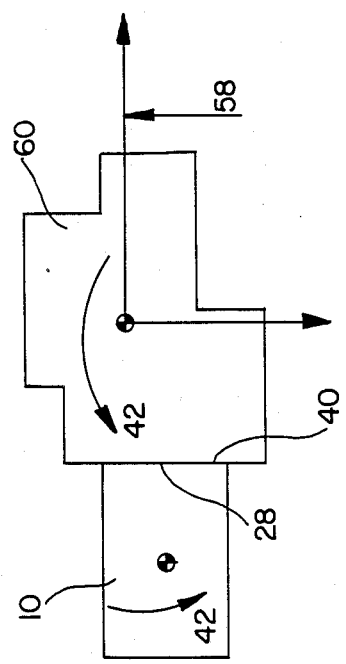
FIG. 13 of the drawing illustrates the heat transfer parameters in order to predict the temperature distribution in seal rings.

To implement this idea of zero net thermal rotation in accordance with the invention, the seal rings must be shaped and have heat transfer characteristics such that the rotations 42 and 42' of both rings are algebraically identical as shown in FIGS. 10-12. FIG. 13 illustrates how to predict the amount of thermal rotation 42 so that the rings can be designed to have a zero net thermal taper. The circular objects at the center of both rings 10 and 60 represent the centroids of the rings. Seal face surfaces slide on each other at their interface 28 and produce heat 40. The temperature distribution T(x,y) across the area of the rings can be determined from the cross-sectional geometry of both rings 10 and 60, the thermal conductivities of the ring materials, and the convection coefficient h(s) at the boundary, and the heat 40 at the interface 28, using well-established principles. Given this temperature distribution T(x,y), one can predict the thermal rotation $\phi_t$ 42 of each of the rings using, for example, the following equation.

$$\phi_t \approx \frac{r_c^2 (Ar_c^2 + J_y) \frac{\alpha yTdA}{A} - r_c^2 J_{xy} \frac{\alpha TdA}{A}}{J_x (Ar_c^2 + J_y) - J_{xy}^2} \quad \text{(Equation 4)}$$

wherein $\phi_t$ is the thermal rotation, $r_c$ 58 is the radius to the centroid, A is the cross-sectional area of the ring, $J_x$, $J_y$ and $J_{xy}$ are moments of inertia, $\alpha$ is the coefficient of thermal expansion, and T is the temperature. Equation 4 was disclosed in Lebeok, A. O., "A Mixed Friction Hydrostatic Mechanical Face Seal Model with Thermal Rotation and Wear," *ASLE Translations*, vol. 23, no. 4, October 1980, pp. 375-387. Using this equation, or even more precise tools based on finite element methods, one can determine that there are certain geometries and certain types of temperature distributions which give thermal rotations which are opposite to those obtained for conventional designs. For example, the first term in the numerator of the above equation can take on either a positive or negative sign depending on where the temperature is highest relative to the location of the centroid. Thus, it is possible to design seal rings having opposite to conventional thermal-rotation characteristics.

Figure 14:
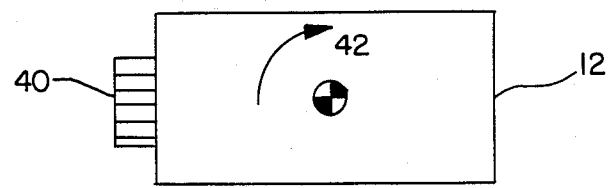
FIG. 14 of the drawing illustrates conventional seal ring having a positive thermal rotation.
Figure 15:
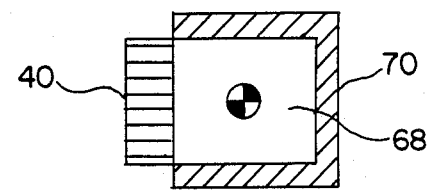
FIG. 15 of the drawing illustrates an insulated seal ring having no thermal rotation of the zero net radial taper seal design of the invention.
Figure 16:
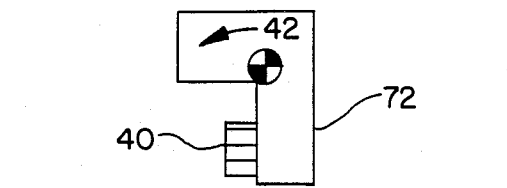
FIG. 16 of the drawing illustrates an OD inverted seal ring having a negative thermal rotation of the zero net radial taper seal design of the invention.
Figure 17:
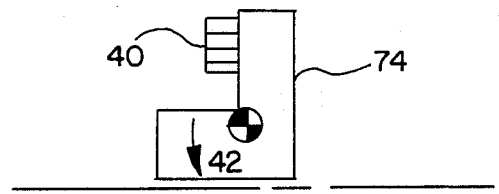
FIG. 17 of the drawing illustrates an ID inverted seal ring having a negative thermal rotation of the zero net radial taper seal design of the invention.
Figure 18:
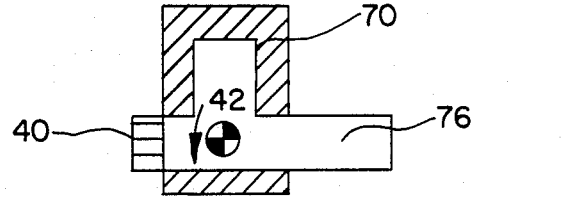
FIG. 18 of the drawing illustrates an insulation/centroid shift seal ring having a negative thermal rotation of the zero net radial taper seal design of the invention.

FIGS. 14-18 shows several embodiments of the invention using Equation 4. The circular objects at the center of the rings in FIGS. 14-18 represent the centroid of the seal ring. Each dashed line represents the center line of the seal ring. FIG. 14 shows a conventional mating ring 12 for reference purposes. In FIG. 14, the thermal rotation 42 is shown as clockwise or positive. The lines 40 illustrate the heat input on the seal ring. FIG. 15 shows a seal ring 68 of the invention which is insulated 70 all around and has zero thermal rotation because its temperature is uniform throughout. FIG. 16 shows a seal ring of the invention having an "L-shaped" radial cross section in which the base of the L is over the contact and the centroid is shifted to the left by shifting some of the ring mass to the left of the contact. For this seal 72, referred to as an "OD inverted seal ring," a negative thermal rotation results. FIG. 17 shows a seal ring 74 of the invention having an "L-shaped" radial cross section, referred to as an "ID inverted seal ring," which is similar to the seal ring 72 of FIG. 16, except that the base of the L is under the contact and shifting is done at the inside of the seal instead of the outside. The same result of negative thermal rotation is obtained by the seal 74 of FIG. 17. Finally, FIG. 18 shows a seal ring 76 of the invention which has an altered heat transfer distribution due to insulation 70 and its geometry; this figure illustrates that one can cause the thermal rotation to become negative even in a more conventional arrangement. Although FIGS. 14-18 illustrate several possible embodiments of the invention to achieve zero net thermal rotation, many other possible embodiments could be used in accordance with the invention.

The above figures illustrate that it is possible to design a pair of seal rings where the net thermal radial taper is zero. This minimizing of the thermal rotation effects is an improvement over conventional seal designs which use conventional geometries.

In the preferred embodiment of the invention, both principles of radial compliance and zero net thermal radial taper are used. Although either principle, used by itself, results in an improved seal design, there are practical limitations to making the face surfaces always remain parallel under various upsetting conditions. To solely use a radially compliant seal ring to comply with commonly encountered thermal radial tapers requires that the ring length $l_r$ 45 be very narrow, which, in many cases, makes design difficult. Even when radial compliance is sufficient, thermal radial taper will sometimes cause a greater wear at the inside diameter than at the outside diameter, which will lead eventually to life limitations. The main limitation of using a zero net thermal rotation seal ring is that, while one can zero the rotation at all steady-state operating conditions, one cannot also zero the rotation during transients. Thus, in a seal where operating conditions change, the zero net thermal taper seal ring will still be subject to uneven wear, although not as much as a conventional seal having normal thermal rotation characteristics.

Thus, in the preferred embodiment of the invention, both of these principles are utilized simultaneously. The preferred seal of the invention is therefore a radially compliant - zero net thermal radial taper design. The radial compliance offsets the problem of residual net thermal radial taper during transients. Radial compliance also offsets problems of nonuniform contact caused by the small levels of both thermal and mechanical distortion which result due to imperfections of design and materials. The zero net thermal rotation offsets the problem of unequal wear in the radial compliant design.

Figure 19:
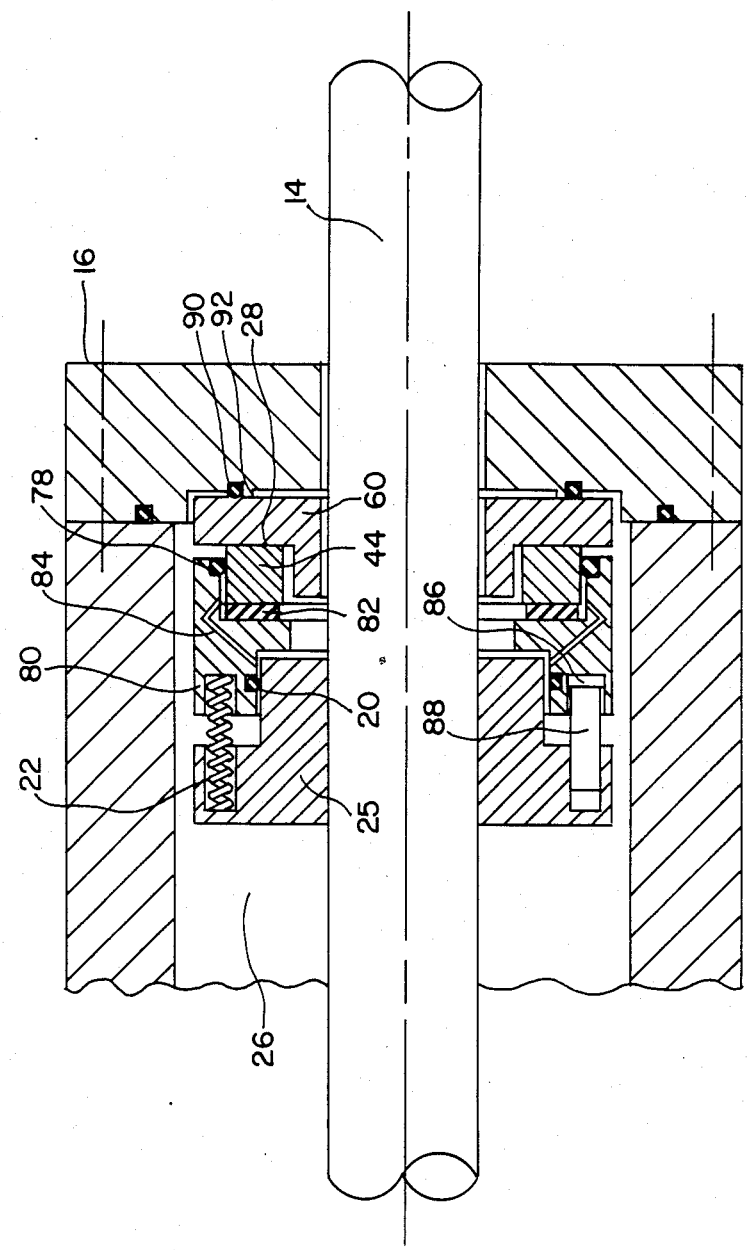
FIG. 19 of the drawing is a cross-sectional side view of the preferred seal embodiment of the invention, having a radially compliant seal ring and a zero net thermal radial taper seal design.

FIG. 19 shows the preferred embodiment of the invention comprising a radially compliant - zero net thermal radial taper seal. The two most important features of this seal are its radial compliance and its zero net thermal radial taper design as described above. The physical features described below are preferred seal features in order to make these ring design features operative. With reference to FIG. 19, the seal comprises a narrow primary ring 44 which is of a radially compliant seal ring design and a mating ring 60 which is of a zero net radial taper design. Although the specification and claims generally discuss the use of a radially compliant design for a primary ring and a zero net radial taper design for a mating ring, these ring designs could be interchanged. These two rings 44 and 60 contact each other at the interface 28.

The geometry of the radially compliant primary ring 44 is selected such that the maximum compliance angle $\phi_{compliance}$, calculated in accordance with Equation 2, is greater than the calculated maximum residual thermal and mechanical radial taper. The primary ring 44 is preferably made of carbon or some other suitable face seal material. A low Young's modulus material, such as carbon, enhances the compliance of the primary ring 44 to the mating ring 60. The cross section or length $l_r$ of the ring 44 is very narrow compared to prior art ring designs. Both the radial and the tangential stiffness are preferably low enough so that the face readily flatens against the face of the mating ring 60 under all conditions of operation. The maximum axial length of the ring 44 can be determined in accordance with Equations 2 or 3. Using these equations, the ring length $l_r$ of the radially compliant ring of the invention is often on the order of the radial face width of the ring. This compares to a conventional seal ring length which is normally many times the radial face width of the ring.

A seal ring 44 with a small length $l_r$ requires that the ring 44 be mounted in an unconventional manner. The mechanical moments on the primary seal ring 44 are preferably balanced out to zero so as to minimize the amount of tilt caused by fluid pressure. This zero balancing can be achieved by the suitable placement of a tertiary seal 78 around the seal ring 44. The tertiary seal 78 can be very small in diameter because the relative radial motion which must be accommodated can be very small. This zero balancing assures that the wear across the face will be as uniform as possible.

Other features which aid the operation of the radially compliant primary ring 44 are a carrier 80, a secondary seal 20, and an elastomer 82. The carrier 80 preferably forms part of the primary ring 46. The carrier 80 is mounted flexibly, just as conventional primary rings, and is sealed by the flexible secondary O-ring seal 20. The primary ring 44 is loaded by the elastomer 82 which is placed between the carrier 80 and the seal ring 44. The function of the elastomer 82 is to transmit the entire load from the sealed pressure to the seal ring 44 without imposing any moment on it. The elastomer 82 should be compliant so that the load is uniform regardless of distortions and operating conditions. A second function of the elastomer 82 is to act as an insulator for heat between the primary ring 44 and the carrier 80. This has the effect of reducing the axial temperature gradient across the seal ring 44 and therefore reduces thermal distortion. A third function of the elastomer 82 is to serve as a drive between the carrier 80 and the primary seal ring 44.

The elastomer 82 and the tertiary seal 78 can be readily formed from the same rubber material so as to comprise a one-piece rubber mounting which carries out the functions of both parts. The secondary seal 20 and the carrier 80 can also be incorporated into a one-piece arrangement which accomplishes the functions of the carrier 80 the seals 20 and 78, and the elastomer 82.

Preferably, the seal of the invention further comprises a bleed passage 84. This bleed passage 84 prevents any small leakage which gets past the tertiary seal 78 from causing fluid pressure to build up behind the seal ring 44. Such a pressure buildup would be undesirable because the fluid pressure could assume a pressure distribution across the elastomer 82 which would cause large undesirable distortions in the primary seal ring 44. Bleed passages 84 are preferably placed in the elastomer 82 or the primary seal ring 44. The bleed passage 84, shown in FIG. 19, is shown as a hole in the carrier for the purpose of clarifying its function.

There are several possible arrangements for driving the carrier 80; FIG. 19 illustrates only one of many possible drive arrangement. FIG. 19 shows a drive slot 86 and a drive pin 88. It is very important in designing the drive arrangement to be sure that because of unequal drive slot 86 positioning, the carrier 80 is not pushed to a limit in some radial direction, so as to cause the O-ring 20 to have less squeeze on one side, which can cause leakage and increase axial sliding friction.

The zero net radial taper mating ring 60 of the invention is designed so that the net thermal rotation caused by itself 60 and the primary seal ring 44 is zero or near zero. FIG. 19 shows this mating ring 60 as an ID inverted seal ring having a negative thermal radial taper coefficient. Other possible forms or designs for the mating ring 60, including the embodiments shown in FIGS. 14–18, may be utilized in accordance with the invention, depending upon the particular application. The mating ring 60 is preferably made of a hard material, such as stainless steel, tungsten carbide, silicon carbide, ceramic, or other conventional face materials, common to the art. Material choice depends upon the sealed fluid 26 as well as the cost of manufacture and operation. The mating ring 60 is preferably machined flat to conventional standards.

The seal of the present invention preferably further comprises an O-ring seal 90 and a load annulus 92. The O-ring seal 90 and the load annulus 92 are preferably placed so as to facilitate zeroing of the mechanical moment.

The seal of the invention has a conventional housing 16, a shaft 14, and sealed fluid 26. Conventional urging means or springs 22 may be used to preload the seal assembly as in conventional seals.

The features and advantages of the radially compliant - zero net radial taper seal of the invention are discussed below. The first important feature of this seal is that it is more compliant both radially and tangentially than conventional seals. Face surfaces tend to stay flat against each other in spite of either residual or transient thermal distortions and residual mechanical distortions. The second important feature of this seal is that the steady-state net thermal rotation of the faces is zeroed out by design so that seal contact will be uniform radially across the face most of the time during the seal operation. Because of these features, some of the advantages of the radially compliant - zero net thermal radial taper mechanical face seal of the invention over conventional prior art seals are as follows:

(1) The radially compliant - zero net thermal radial taper mechanical face seal maintains contact across the entire face under all circumstances, including transients, and therefore gives the lowest possible leakage during changing conditions as well as during steady operation. Since wear is uniform, the low leakage rate tends to be constant over the life of the seal rather than gradually increasing, which generally occurs in conventional prior art seals in which the seal face surfaces wear to a nonflat condition.

(2) The uniform wear expected with the radially compliant - zero net thermal radial taper mechanical face seal results in a more consistent performance than conventional prior art seals because small changes in distortion do not change the quality of lubrication. Thus, the seal of the invention tends to wear out over a long period of time rather than failing suddenly at some shorter period of time.

(3) Because the face surfaces remain parallel with wear under all operating conditions, the hydrostatic pressure distribution stays the same. This allows the seal of the invention to be balanced to a greater extent than conventional prior art seals. With the radially compliant - zero net thermal radial taper mechanical face seal design, seals can be operated at lower balance ratios than conventional seals. As an example, the seal of the invention can be successfully operated at the low balance ratio of 50% in an all-liquid application; this compares to a minimum 65% to 75% balance ratio for conventional prior art seals. Thus, the seal lasts longer under the same pressure and speed conditions than a conventional prior art design, and/or permits a given pair of materials to be used at greater pressure and speed duty levels than with conventional designs.

(4) In seal applications where there is considerable cycling of the seal speed and pressure, failure is accelerated because each change in conditions causes uneven wear of the face surfaces due to thermal distortion. The radially compliant - zero net thermal radial taper mechanical face seal of the invention is a vast improvement over prior art seal designs since its face surfaces remain parallel in the presence of cyclic operation.

Although the invention has been described with reference to these preferred embodiments, other embodiments can achieve the same results. Variations and modifications of the present invention will be obvious to those skilled in the art and it is intended to cover in the appended claims all such modifications and equivalents.

EXAMPLE

A radially compliant ring made of carbon was tested over 2000 hours to determine its wear. Table 1 shows the wear results.

TABLE 1

CARBON WEAR RESULTS TEST #142

| Position | Groove Depth (Micro inches) | | | | Wear (Micro inches) | |
|---|---|---|---|---|---|---|
| | Initial | | Final | | | |
| | Outside | Inside | Outside | Inside | Outside | Inside |
| 1 | 3850 | 3950 | 3550 | 3850 | 300 | 100 |
| 2 | 4050 | 4050 | 3775 | 4050 | 275 | 0 |
| 3 | 4300 | 4200 | 3850 | 4050 | 450 | 150 |
| 4 | 4350 | 4350 | 4025 | 4175 | 325 | 175 |
| 5 | 4525 | 4400 | 4150 | 4150 | 375 | 250 |
| 6 | 4400 | 4400 | 4250 | 4325 | 150 | 75 |
| 7 | 4150 | 4175 | 3875 | 4100 | 275 | 75 |
| 8 | 4050 | 4050 | 3650 | 3900 | 400 | 150 |
| Average Wear: | | | | | 319 μin | 122 μin |

Accordingly, a new and improved seal and seal ring design have been discovered which achieve radial compliance and a zero net thermal rotation. Use of the seal and ring of the invention provide a seal with minimal leakage, higher tolerance to variable operating conditions, and a longer life or higher duty capability.

We claim:

1. A radially compliant face seal ring for use in a mechanical face seal, when provided, wherein said mechanical face seal comprises a housing, a rotating shaft, said radially compliant face seal ring, an opposing ring which is opposite to and contacts said face seal ring to provide a parallel face, sealed fluid to provide a sealed pressure, urging means to provide a spring pressure, and balancing means to provide a balance ratio, and wherein said radially compliant face seal ring is made of a low Young's modulus material and comprises an axial ring length which is approximately described by the equation:

$$\left[ \frac{6 [p_o (B - \frac{1}{2}) + p_s] \Delta r r_c^2}{E \phi_{compliance}} \right]^{\frac{1}{2}}$$

wherein $p_o$ is the sealed pressure of the seal, B is the balance ratio of the seal, $p_s$ is the spring pressure of the seal, $\Delta r$ is the face width of the seal, $r_c$ is the radius to the centroid of said face seal ring, E is the Young's modulus of said radially compliant face seal ring, and $\phi_{compliance}$ is the maximum angular difference to which said radially compliant face seal ring can comply with said opposing ring while remaining in contact with said opposing ring.

2. A radially compliant face seal ring in accordance with claim 1 wherein the axial ring length of said radially compliant face seal ring is on the order of the radial face width of the radially compliant face seal ring.

3. A radially compliant face seal ring for use in a mechanical face seal, when provided, wherein said mechanical face seal comprises a housing, a rotating shaft, said radially compliant face seal ring, an opposing ring which is opposite to and contacts said radially compliant face seal ring to provide a parallel face, sealed fluid, and urging means, and wherein said radially compliant face seal ring is made of a low Young's modulus material and comprises an axial ring length which is approximately less than the value described by the equation:

$$\left[\frac{3}{\pi E K_t f \omega}\right]^{\frac{1}{2}}$$

wherein E is the Young's modulus of said radially compliant face seal ring, $K_t$ is the thermal rotation coefficient of the face in terms of rotation per unit of power, f is the friction coefficient associated with contact friction at the face, and $\omega$ is the angular speed of the rotating shaft.

4. A radially compliant face seal ring in accordance with claim 3 wherein the axial ring length of said radially compliant face seal ring is on the order of the radial face width of the radially compliant face seal ring.

5. A mechanical face seal comprising:
  (a) a radially compliant face seal ring which is made of a low Young's modulus material;
  (b) an opposing face seal ring which is opposite to and contacts said radially compliant face seal ring to provide a parallel face;
  (c) a housing;
  (d) a rotating shaft;
  (e) sealed fluid to provide a sealed pressure;
  (f) urging means to provide a spring pressure; and
  (g) balancing means to provide a balance ratio;
wherein said radially compliant ring comprises an axial ring length which is approximately described by the equation:

$$\left[\frac{6[p_o(B-\frac{1}{2})+p_s]\Delta r r_c^2}{E\phi_{compliance}}\right]^{\frac{1}{2}}$$

wherein $p_o$ is the sealed pressure of the seal, B is the balance ratio of the seal, $p_s$ is the spring pressure of the seal, $\Delta r$ is the face width of the seal, $r_c$ is the radius to the centroid of said radially compliant face seal ring, E is the Young's modulus of said radially compliant face seal ring, and $\phi_{compliance}$ is the maximum angular difference to which said radially compliant face seal ring can comply with said opposing ring while remaining in contact with said opposing ring.

6. A mechanical face seal comprising:
  (a) a radially compliant face seal ring which is made of a low Young's modulus material;
  (b) an opposing face seal ring which is opposite to and contacts said radially compliant face seal ring to provide a parallel face;
  (c) a housing
  (d) a rotating shaft;
  (e) sealed fluid; and
  (f) urging means;
wherein said radially compliant face seal ring comprises an axial ring length which is approximately less than the value described by the equation:

$$\left[\frac{3}{\pi E K_t f \omega}\right]^{\frac{1}{2}}$$

wherein E is the Young's modulus of said radially compliant face seal ring, $K_t$ is the thermal rotation coefficient of the face in terms of rotation per unit of power, f is the friction coefficient associated with contact friction at the face, and $\omega$ is the angular speed of the rotating shaft.

7. A mechanical face seal having a net zero thermal rotation comprising:
  (a) a first face seal ring having a thermal rotation; and
  (b) an opposing face seal ring which is opposite to and contacts said first face seal ring to provide a parallel face, and which has a thermal rotation which is approximately equal to the thermal rotation of the first face seal ring, resulting in a zero net thermal rotation for the face of the seal;
  (c) a housing;
  (d) a rotating shaft;
  (e) sealed fluid to provide a sealed pressure;
  (f) urging means to provide a spring pressure; and
  (g) balancing means to provide a balance ratio.

8. A mechanical face seal in accordance with claim 7 wherein said mechanical face seal further comprises insulation around at least one of said face seal rings.

9. A mechanical face seal in accordance with claim 8 wherein said first face seal ring and said opposing face seal ring have net thermal rotations which are approximately equal to zero.

10. A mechanical face seal in accordance with claim 7 wherein said opposing face seal ring has an L-shaped radial cross section such that the base of the L is over the contact between said first face seal ring and said opposing ring and the centroid of said opposing face seal ring is above this contact.

11. A mechanical face seal in accordance with claim 7 wherein said opposing face seal ring has an L-shaped radial cross section such that the base of the L is under the contact between said first face seal ring and said opposing ring and the centroid of said opposing face seal ring is below this contact.

12. A mechanical face seal in accordance with claim 7 wherein said first face seal ring is a radially compliant face seal ring which is made of a low Young's modulus material and which comprises an axial ring length which is approximately described by the equation:

$$\left[\frac{6[p_o(B-\frac{1}{2})+p_s]\Delta r r_c^2}{E\phi_{compliance}}\right]^{\frac{1}{2}}$$

wherein $p_o$ is the sealed pressure of the seal, B is the balance ratio of the seal, $p_s$ is the spring pressure of the seal, $\Delta r$ is the face width of the seal, $r_c$ is the radius to the centroid of said radially compliant face seal ring, E is the Young's modulus of said radially compliant face seal ring, and $\phi_{compliance}$ is the maximum angular difference to which said radially compliant face seal ring can comply with said opposing face seal ring while remaining in contact with said opposing face seal ring.

13. A mechanical face seal in accordance with claim 7 wherein said first face seal ring is a radially compliant face seal ring which is made of a low Young's modulus material and which comprises an axial ring length which is approximately less than the value described by the equation:

$$\left[\frac{3}{\pi E K_t f \omega}\right]^{\frac{1}{2}}$$

wherein E is the Young's modulus of said face seal ring, $K_t$ is the thermal rotation coefficient of the face in terms of rotation per unit of power, f is the friction coefficient associated with contact friction at the face, and ω is the angular speed of the rotating shaft.

14. A mechanical face seal in accordance with claim 13 wherein said mechanical face seal further comprises:
   (a) a flexibly mounted carrier;
   (b) a secondary seal which seals said carrier;
   (c) an elastomer which is positioned between said carrier and said first face seal ring; and
   (d) a tertiary seal for sealing said first face seal ring.

15. A mechanical face seal in accordance with claim 14 wherein said elastomer and said tertiary seal are formed from the same material.

16. A mechanical face seal in accordance with claim 14 wherein said carrier, said secondary seal, said elastomer and said tertiary seal are formed from the same material.

17. A mechanical face seal in accordance with claim 14 further comprising a bleed passage to prevent leakage past said tertiary seal from causing fluid pressure to build up behind said first face seal ring.

18. A mechanical face seal ring in accordance with claim 7 wherein said opposing face seal ring is made of a high Young's modulus material.

* * * * *

UNITED STATES PATENT AND TRADEMARK OFFICE
CERTIFICATE OF CORRECTION

PATENT NO. : 4,792,146
DATED : December 20, 1988  Page 1 of 3
INVENTOR(S) : Alan O. Lebeck and Lionel A. Young It is certified that error appears in the above-identified patent and that said Letters Patent is hereby corrected as shown below:

In the Specification:
In Column 1, at line 59, delete "4,991,450", and insert therefor --4,391,450--.
In Column 2, at line 47, delete "$\zeta$", and insert therefor -- $\omega$ --.
In Column 3, at line 49, delete "at".
In Column 5, at line 27, delete the "s" following --face--.
In Column 5, at line 33, delete the "s" following --show--.
In Column 6, at line 17, delete the "s" following --illustrate--.
In Column 7, at line 22, between "and" and "is", insert -- $\omega$ --.
In Column 7, at line 25, delete the "s" following --illustrate--.
In Column 7, at line 61, Equation 4 should read:

$$\phi_t = \frac{r_c^2 (Ar_c^2 + J_y) \int_A \alpha y T dA - r_c^2 J_{xy} \int_A \alpha T dA}{J_x (Ar_c^2 + J_y) - J_{xy}^2}$$

In Column 8, at line 1, delete "Lebeok", and insert therefor --Lebeck--.
In Column 8, at line 16, delete the "s" following --show--.

UNITED STATES PATENT AND TRADEMARK OFFICE
CERTIFICATE OF CORRECTION

PATENT NO. : 4,792,146
DATED : December 20, 1988
INVENTOR(S) : Alan O. Lebeck and Lionel A. Young Page 2 of 3

It is certified that error appears in the above-identified patent and that said Letters Patent is hereby corrected as shown below: Figures 5, 8 and 12 should appear as shown below:

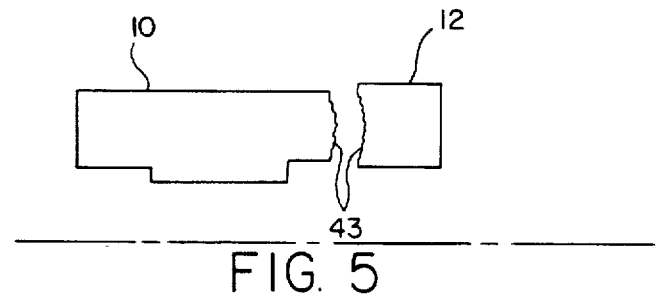

FIG. 5

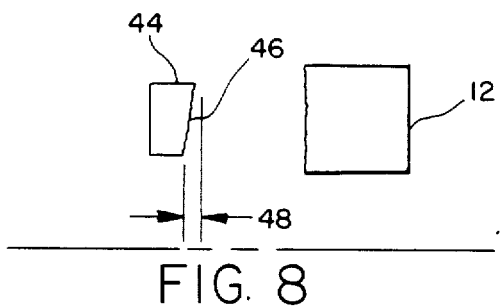

FIG. 8

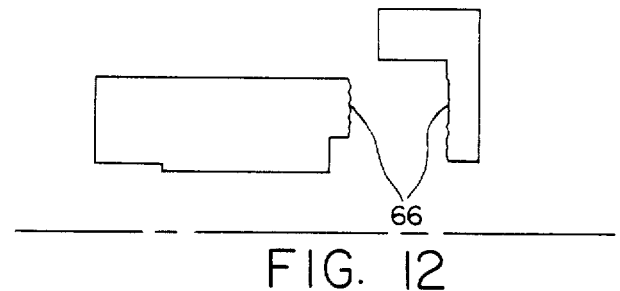

FIG. 12

UNITED STATES PATENT AND TRADEMARK OFFICE
CERTIFICATE OF CORRECTION

PATENT NO. : 4,792,146

DATED : December 20, 1988

Page 3 of 3

INVENTOR(S) : Alan O. Lebeck and Lionel A. Young

It is certified that error appears in the above-identified patent and that said Letters Patent is hereby corrected as shown below: Figure 19 should appear as shown below:

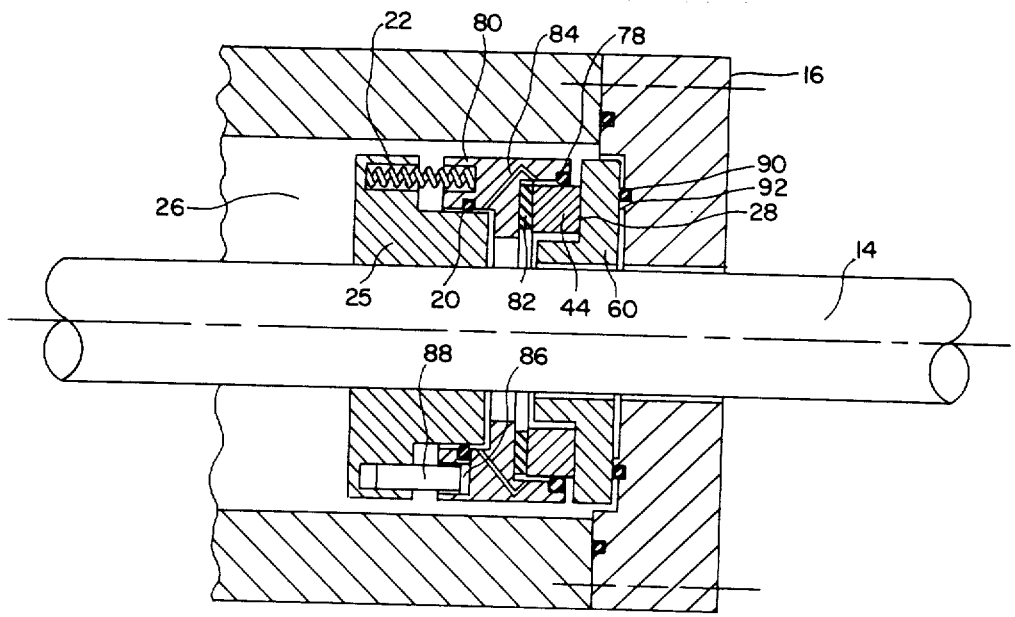

FIG. 19

Signed and Sealed this

Twentieth Day of June, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,792,146
DATED : December 20, 1988
INVENTOR(S) : ALAN O. LEBECK, et al.

It is certified that error appears in the above-identified patent and that said Letters Patent is hereby corrected as shown below:

The first paragraph in column 1 of the Specification before the heading BACKGROUND OF THE INVENTION should read as follows:

This invention was made with government support under a contract awarded by the U.S. Department of the Navy, Office of Naval Research. The Government has certain rights in this invention.

Signed and Sealed this
First Day of August, 1989

*Attest:*

DONALD J. QUIGG

*Attesting Officer*    *Commissioner of Patents and Trademarks*